United States Patent [19]

Hintz et al.

[11] Patent Number: 5,177,115

[45] Date of Patent: * Jan. 5, 1993

[54] OIL-RESISTANT, EXPANDABLE STYRENE POLYMERS

[75] Inventors: Hans Hintz, Ludwigshafen; Klaus Hahn, Kirchheim; Uwe Guhr, Gruenstadt; Michael Riethues, Ludwigshafen, all of Fed. Rep. of Germany

[73] Assignee: BASF Aktiengesellschaft, Ludwigshafen, Fed. Rep. of Germany

[*] Notice: The portion of the term of this patent subsequent to Nov. 24, 2009 has been disclaimed.

[21] Appl. No.: 793,724

[22] Filed: Nov. 20, 1991

[30] Foreign Application Priority Data

Nov. 29, 1990 [DE] Fed. Rep. of Germany ....... 4038042

[51] Int. Cl.$^5$ ................................. C08J 9/16
[52] U.S. Cl. ........................... 521/59; 521/56; 521/60; 521/139
[58] Field of Search ............. 521/56, 60, 59, 139

[56] References Cited

U.S. PATENT DOCUMENTS 4,520,135 5/1985 Hahn et al. ..................... 521/56
4,906,698 3/1990 Kusano et al. ................... 521/590
4,908,392 3/1990 Kusano et al. ................... 521/59
4,990,540 2/1991 Hahn et al. ...................... 521/59

FOREIGN PATENT DOCUMENTS 3936596 5/1991 Fed. Rep. of Germany.

*Primary Examiner*—Morton Foelak
*Attorney, Agent, or Firm*—Keil & Weinkauf

[57] ABSTRACT

An oil-resistant, expandable styrene polymer contains a) from 10 to 90% by weight of uncrosslinked polystyrene and/or an uncrosslinked styrene copolymer containing at least 50% by weight of copolymerized styrene, b) from 10 to 90% by weight of a crosslinked styrene polymer which contains at least 0.1% by weight, but less than 2% by weight, of a copolymerized monomer having at least two olefinic double bonds, c) from 1 to 10% by weight, based on the sum of a) and b), of a $C_3$- to $C_6$-hydrocarbon as blowing agent, and, if desired, d) conventional additives in effective amounts, the mixture of a) and b) having a melt flow index MFI (200° C., 5.0 kp) in accordance with DIN 53 735 of from 1 to 20 [g/10 min].

3 Claims, No Drawings

OIL-RESISTANT, EXPANDABLE STYRENE POLYMERS

The present invention relates to novel expandable styrene polymers for the production of oil-resistant foams.

Foams based on styrene polymers have achieved considerable industrial importance as thermal insulation and packaging materials. However, their lack of resistance to oils means that they are of limited suitability in the automotive and maritime sectors.

It is an object of the present invention to develop oil-resistant polystyrene foams.

We have found that, surprisingly, this object is achieved by mixtures of uncrosslinked polystyrene and crosslinked polystyrene which give oil-resistant foams, even though the uncrosslinked principal constituent is not oil-resistant.

The present invention accordingly provides an oil-resistant, expandable styrene polymer containing
a) from 10 to 90% by weight of uncrosslinked polystyrene and/or an uncrosslinked styrene copolymer containing at least 50% by weight of copolymerized styrene,
b) from 10 to 90% by weight of a crosslinked styrene polymer which contains at least 0.1% by weight, but less than 2% by weight, of a copolymerized monomer having at least two olefinic double bonds,
c) from 1 to 10% by weight, based on the sum of a) and b), of a $C_3$- to $C_6$-hydrocarbon as blowing agent, and, if desired,
d) conventional additives in effective amounts,
the mixture of a) and b) having a melt flow index MFI (200° C., 5.0 kp) in accordance with DIN 53 735 of from 1 to 20 [g/10 min].

The present invention furthermore provides a process for the preparation of an oil-resistant, expandable styrene polymer, which comprises polymerizing styrene, in the presence or absence of up to 50% by weight, based on the monomer mixture, of a further monomer having an olefinic double bond, in aqueous suspension in the presence of from 0.08 to 0.5% by weight of a crosslinking monomer having at least two olefinic double bonds and in the presence of from 0.01 to 3% by weight of a conventional regulator having a chain transfer constant K of from 0.1 to 50, and adding the blowing agent and, if used, conventional additives before, during or after the polymerization.

The present invention moreover provides an oil-resistant foam having a density of from 0.005 to 0.1 $g/cm^3$ and containing
a) from 10 to 90% by weight of uncrosslinked polystyrene and/or an uncrosslinked styrene copolymer containing at least 50% by weight of copolymerized styrene,
b) from 10 to 90% by weight of a crosslinked styrene polymer which contains at least 0.1% by weight, but less than 2% by weight, of a copolymerized monomer having at least two olefinic double bonds, and, if desired,
c) conventional additives in effective amounts,
the mixture of a) and b) having a melt flow index MFI (200° C., 5.0 kp) in accordance with DIN 53 735 of from 1 to 20 [g/10 min].

Surprisingly, the foams produced from the novel expandable styrene polymers have high dimensional stability, even at elevated temperature.

The earlier DE-A 39 36 596 describes expandable styrene polymers based on a mixture of uncrosslinked polystyrene and a crosslinked styrene-diene copolymer having a diene content of from 2 to 45% by weight.

EP-B 106 129 recommends increasing the expandability of styrene polymers containing blowing agents by polymerizing the styrene in the presence of from 0.01 to 1% by weight of a mercaptan. Carrying out this process in the presence of compounds having two polymerizable double bonds results, for example, in reduced expandability, even if from 0.01% by weight of divinylbenzene is added.

As the principal component a), the novel products contain from 10 to 90% by weight, preferably from 20 to 80% by weight, in particular from 30 to 70% by weight, of polystyrene and/or a styrene copolymer containing at least 50% by weight, preferably at least 80% by weight, of copolymerized polystyrene. Examples of suitable comonomers are α-methylstyrene, ring-halogenated styrenes, ring-alkylated styrenes, acrylonitrile, esters of acrylic or methacrylic acid with alcohols having from 1 to 8 carbon atoms, N-vinylcarbazole, maleic acid and malic anhydride. Component a) is uncrosslinked, i.e. is soluble in boiling toluene.

In general, component a) has a viscosity number in accordance with DIN 53 726, measured in toluene (0.005 g/ml, 25° C.), of from 50 to 200, preferably from 70 to 180, in particular from 100 to 170 [ml/g].

A component b) which is essential to the invention, the novel products contain from 10 to 90% by weight, preferably from 20 to 80% by weight, in particular from 30 to 70% by weight, of a crosslinked styrene polymer which contains at least 0.1% by weight, but less than 2% by weight, preferably from 0.1 to 0.5% by weight, of a copolymerized monomer having at least two olefinic double bonds. Examples of suitable comonomers are butadiene, isoprene, divinylbenzene, butanediol diacrylate, hexanediol diacrylate and the like. Component b) is uniformly distributed in the polystyrene matrix of component a), presumably essentially as a network. This type of distribution can be obtained, for example, by polymerizing a solution of an uncrosslinked styrene-diene copolymer in styrene; the copolymer crosslinks with grafting. This distribution is advantageously achieved by polymerizing styrene in the presence of a crosslinking monomer and a regulator, the latter components being used in such amounts that only some of the polymer is crosslinked. Component b) is crosslinked, i.e. is insoluble in boiling toluene. A proportion of crosslinked component b) in the mixture of a) and b) can easily be measured by extraction with boiling toluene and determination of the toluene-insoluble residue.

The mixture of a) and b) should have a melt flow index MFI 200/5.0 in accordance with DIN 53 735 of from 1 to 20, preferably from 2 to 15, in particular from 3 to 10. An excessively low melt flow index means unsatisfactory expandability; an excessively high melt flow index means unsatisfactory oil resistance.

The blowing agent c) present in the expandable styrene polymers is from 1 to 10% by weight, based on the sum of a) and b), preferably from 3 to 8% by weight, in particular from 5 to 8% by weight, of a $C_3$- to $C_6$-hydrocarbon, such as propane, butane, isobutane, n-pentane, isopentane, neopentane and/or hexane. Preference is given to a commercially available pentane mixture.

The expandable styrene polymers may furthermore contain d) conventional additives in effective amounts, such as dyes, fillers, stabilizers, flameproofing agents, synergists, nucleating agents, lubricants, antistatics, substances which have an antiadhesive effect during foaming, and agents for shortening the demolding time on expansion.

Other suitable additives are poly(2,6-dimethyl)-1,4-phenylene ether and poly-1,4-phenylene sulfide. In amounts of from 1 to 20% by weight, based on component a), these additives increase the heat resistance of the foam.

Other suitable additives are finely divided organic polymers having a high water absorption capacity (cf. DE-A 40 14 261), which also improve the free-flowing properties.

The expandable styrene polymers are generally in the form of particles, ie. beads, granules or lumps, and advantageously have a mean diameter of from 0.1 to 6 mm, in particular from 0.4 to 3 mm.

They can be prepared, for example, by mixing the components in the melt in an extruder, and cooling the extrudate sufficiently quickly so that expansion does not occur. The extrudate is subsequently comminuted.

In a preferred process, the expandable styrene polymers according to the invention are prepared by polymerizing styrene in aqueous suspension, in the presence or absence of comonomers, the above-described blowing agent and, if used, the additives being added before, during or after the polymerization. It is essential to the invention that the polymerization be carried out in the presence both of a regulator and of a crosslinking monomer having at least two olefinic double bonds.

The process is usually carried out using from 0.01 to 3% by weight, preferably from 0.02 to 2% by weight, in particular from 0.1 to 1% by weight, of a regulator having a chain transfer constant K of from 0.1 to 50, preferably from 1 to 30, as described in EP-B 106 129 and DE-A 39 21 148. Examples of suitable regulators are thiols, such as n-dodecyl mercaptan (K=19), tert-dodecyl mercaptan (K=3), n-butyl mercaptan (K=22) and tert-butyl mercaptan (K=3.6), and furthermore pentaphenylethane (K=2.0) and dimeric α-methylstyrene (K=0.5).

Examples of suitable crosslinking agents are butadiene, isoprene, divinylbenzene, butanediol diacrylate, butanediol dimethacrylate, hexanediol diacrylate and the like. Preference is given to divinylbenzene. The crosslinking agent is generally used in an amount of from 0.08 to 0.5% by weight, preferably from. 0.1 to 0.3% by weight. The necessary amount of crosslinking agent can easily be determined by preliminary experiments depending on the desired proportion of crosslinked component b). When the polymerization is complete, the crosslinking agent is substantially copolymerized in the crosslinked component b). Only insignificant amounts are copolymerized in the uncrosslinked component a).

The regulator and crosslinking agent are either introduced into the reactor before commencing the polymerization or alternatively added during the polymerization, for example at a conversion of from 20 to 80%. It is advantageous to introduce the crosslinking agent before commencing the polymerization and to delay addition of the regulator until during the polymerization.

The polymerization catalysts used are the conventional initiators for free-radical styrene polymerization, in particular organic peroxy compounds, such as peresters, percarbonates, peroxides, peroxycarbonates, perketals and others. Particular success has been achieved using a combination of peroxy compounds which decompose at low temperature, such as dibenzoyl peroxide or t-butyl peroxy-2-ethylhexylhexanoate, with those which decompose at elevated temperature, such as tert-butyl perbenzoate and dicumyl peroxide.

Simultaneous use of a regulator and a crosslinking agent gives a mixture of uncrosslinked and crosslinked styrene polymers, which has particularly good oil resistance and is readily expandable.

The styrene content in the expandable styrene polymers should generally be low and is usually less than 0.2% by weight, preferably less than 0.1% by weight, in particular less than 0.08% by weight. In order to achieve this aim, it is expedient, if mercaptans are used as the regulator, to delay their addition until during the polymerization at a conversion of from 20 to 90%.

The blowing agent-containing polystyrene particles according to the invention are in bead form and generally have a diameter of from 0.2 to 4 mm. They can be prefoamed by conventional methods, for example using steam, to give foam particles having a diameter of from 0.5 to 2 cm and a density of from 0.005 to 0.05 g/cm³.

The prefoamed particles can then be foamed to completion by conventional methods by heating in molds which do not seal in a gas-tight manner to give foam moldings having a density of from 0.005 to 0.1 g/cm³.

In the examples, parts are by weight.

EXAMPLE 1

A mixture of 100 parts by weight of water, 0.1 part of sodium pyrophosphate, 0.1 part of magnesium phosphate, 0.1 part of divinylbenzene, 0.1 part of tertdodecyl mercaptan, 100 parts of styrene, 7 parts of pentane, 0.25 part of tert-butyl perbenzoate, 0.15 part of dibenzoyl peroxide and 4 parts of a 10% strength aqueous solution of polyvinylpyrrolidone was introduced into a pressure-tight stirred reactor and heated to 90° C. over the course of 2 hours with stirring, subsequently heated to from 90° C. to 120° C. over the course of 4 hours and subsequently kept at 120° C. for 6 hours. After cooling, the resultant bead polymer having a mean particle diameter of about 1 mm was separated from the aqueous phase, washed and dried.

The expandable styrene polymer obtained was prefoamed in a commercially available stirred prefoamer unit, Rauscher type, using flowing steam to a bulk density of 20 g/l. After interim storage for 24 hours, the foam particles were welded together to form a block in a block mold, Rauscher type, by steam treatment at a pressure of 1.8 bar.

The content of crosslinked component b) is determined by treatment with boiling toluene (72 hours) and separation by centrifugation.

The melt viscosity of a degassed sample (3 hours at 150° C.) is determined in accordance with DIN 53 735 at 200° C. and a weight of 5 kg.

The oil resistance was tested in accordance with DIN 53 428 by in each case storing 5 samples of the foam in cube form with an edge length of 5 cm for 72 hours in heating oil and diesel fuel. The assessment criteria are: 0=unchanged (resistant); 1=changed (somewhat resistant); 2=greatly changed (nonresistant).

The results are shown in the table.

EXAMPLE 2

The procedure was similar to that of Example 1, but 0.6 part of tert-dodecyl mercaptan and 0.1 part of divinylbenzene were used.

EXAMPLE 3

The procedure was similar to that of Example 1, but an additional 1 part of hexabromocyclododecane and 0.2 part of dicumyl peroxide were used.

EXAMPLE 4

The procedure was similar to that of Example 1, but only 4.5 parts of pentane as blowing agent and 0.6 part of tert-dodecyl mercaptan were used.

EXAMPLE 5

The procedure was similar to that of Example 1, but 0.15 part of divinylbenzene and 0.02 part of tertdodecyl mercaptan were used.

EXAMPLE 6

The procedure was similar to that of Example 1, but no divinylbenzene or tert-dodecyl mercaptan were used.

TABLE

| Example | Toluene-soluble content [%] | Viscosity number of the soluble component [ml/g] | Toluene-insoluble content [%] | MVI [ml/10 min] | Oil resistance in diesel fuel |
|---|---|---|---|---|---|
| 1 | 64 | 107 | 36 | 3 | 0 |
| 2 | 80 | 145 | 20 | 5 | 0 |
| 3 | 75 | 140 | 25 | 6 | 0 |
| 4 | 80 | 170 | 20 | 7 | 0 |
| 5 | 30 | 105 | 70 | 20 | 0 |
| 6 (comparison) | 100 | 73 | 0 | 120 | 2 |

We claim:

1. An oil-resistant, expandable styrene polymer in the form of particles containing
   a) from 10 to 90% by weight of uncrosslinked polystyrene and/or an uncrosslinked styrene copolymer containing at least 50% by weight of copolymerized styrene,
   b) from 10 to 90% by weight of a crosslinked styrene polymer which contains at least 0.1% by weight, but less than 2% by weight, of a copolymerized monomer having at least two olefinic double bonds,
   c) from 1 to 10% by weight, based on the sum of a) and b), of a $C_3$- to $C_6$-hydrocarbon as blowing agent, and, if desired,
   d) conventional additives in effective amounts,
the mixture of a) and b) having a melt flow index MFI (200° C., 5.0 kp) in accordance with DIN 53 735 of from 1 to 20 g/10 min.

2. An oil-resistant, expandable styrene polymer as claimed in claim 1, wherein component a) has a viscosity number, measured in toluene, of from 50 to 200 ml/g.

3. An oil-resistant foam having a density of from 0.005 to 0.1 g/cm$^3$ and containing
   a) from 10 to 90% by weight of uncrosslinked polystyrene and/or an uncrosslinked styrene copolymer containing at least 50% by weight of copolymerized styrene,
   b) from 10 to 90% by weight of a crosslinked styrene polymer which contains at least 0.1% by weight, but less than 2% by weight, of a copolymerized monomer having at least two olefinic double bonds, and, if desired,
   c) conventional additives in effective amounts,
the mixture of a) and b) having a melt flow index MFI (200° C., 5.0 kp) in accordance with DIN 53 735 of from 1 to 20 g/10 min.

* * * * *